(12) United States Patent
Cha (10) Patent No.: US 9,174,580 B2
(45) Date of Patent: Nov. 3, 2015

(54) INTELLIGENT SIDE STEP APPARATUS FOR VEHICLE

(71) Applicant: Hyundai Motor Company, Seoul (KR)

(72) Inventor: Dong Eun Cha, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 13/716,802

(22) Filed: Dec. 17, 2012

(65) Prior Publication Data

US 2014/0121859 A1 May 1, 2014

(30) Foreign Application Priority Data

Oct. 31, 2012 (KR) .................. 10-2012-0121974

(51) Int. Cl.
*B60R 3/02* (2006.01)
(52) U.S. Cl.
CPC ........................................ *B60R 3/02* (2013.01)
(58) Field of Classification Search
CPC ................................. B60R 3/00; B60R 3/02
USPC ................................................ 701/2; 280/163
See application file for complete search history.

(56) References Cited

U.S. PATENT DOCUMENTS

| | | | | |
|---|---|---|---|---|
| 7,287,771 | B2* | 10/2007 | Lee et al. ..................... | 280/166 |
| 2002/0093741 | A1* | 7/2002 | Bechtel et al. ............... | 359/604 |
| 2004/0150184 | A1* | 8/2004 | Bang et al. ................... | 280/166 |
| 2005/0002103 | A1* | 1/2005 | Bechtel et al. ............... | 359/604 |
| 2005/0167941 | A1* | 8/2005 | Garland et al. .............. | 280/166 |
| 2006/0091683 | A1* | 5/2006 | Hawthorne ................. | 294/82.28 |
| 2006/0214386 | A1* | 9/2006 | Watson ........................ | 280/163 |
| 2008/0238076 | A1* | 10/2008 | Takao et al. .................. | 280/807 |
| 2009/0184487 | A1* | 7/2009 | Kircher ........................ | 280/166 |
| 2010/0137101 | A1* | 6/2010 | Jeon .............................. | 477/84 |
| 2010/0194070 | A1* | 8/2010 | Stauffer et al. ............... | 280/166 |
| 2011/0233889 | A1* | 9/2011 | Watson ........................ | 280/166 |
| 2012/0280791 | A1* | 11/2012 | Kim ............................. | 340/5.72 |

FOREIGN PATENT DOCUMENTS

| | | |
|---|---|---|
| JP | 2003-182458 A | 7/2003 |
| JP | 2006-205853 A | 8/2006 |
| KR | 10-2004-0046760 | 6/2004 |
| KR | 10-2005-0031491 A | 4/2005 |
| KR | 10-2006-0002107 A | 1/2006 |
| KR | 10-2009-0049677 | 5/2009 |
| KR | 20-2012-0001508 U | 3/2012 |

* cited by examiner

*Primary Examiner* — Calvin Cheung
*Assistant Examiner* — Martin Weeks
(74) *Attorney, Agent, or Firm* — Morgan, Lewis & Bockius LLP (57) ABSTRACT

An intelligent side step apparatus for a vehicle includes a step panel (13) that protrudes and expands to a side of a vehicle body (16) when a getting-off mode signal of a passenger is generated. The step panel (13) moves down to a side of the vehicle body when a getting-on mode signal of a passenger is generated. A step lamp (14) mounted on the step panel (13) is turned on when a night mode signal is generated.

9 Claims, 7 Drawing Sheets

INTELLIGENT SIDE STEP APPARATUS FOR VEHICLE

CROSS-REFERENCE TO RELATED APPLICATION

The present application claims priority of Korean Patent Application Number 10-2012-0121974 filed Oct. 31, 2012, the entire contents of which application is incorporated herein for all purposes by this reference.

BACKGROUND OF INVENTION

1. Field of Invention

The present invention relates to an intelligent side step apparatus for a vehicle, and more particularly, an intelligent side step apparatus for a vehicle which actively adjusts the vertical height and expands in the width direction separately for getting in/out of a vehicle and is equipped with a lamp that is turned on in a night mode for safety of passengers.

2. Description of Related Art

Figure 1:
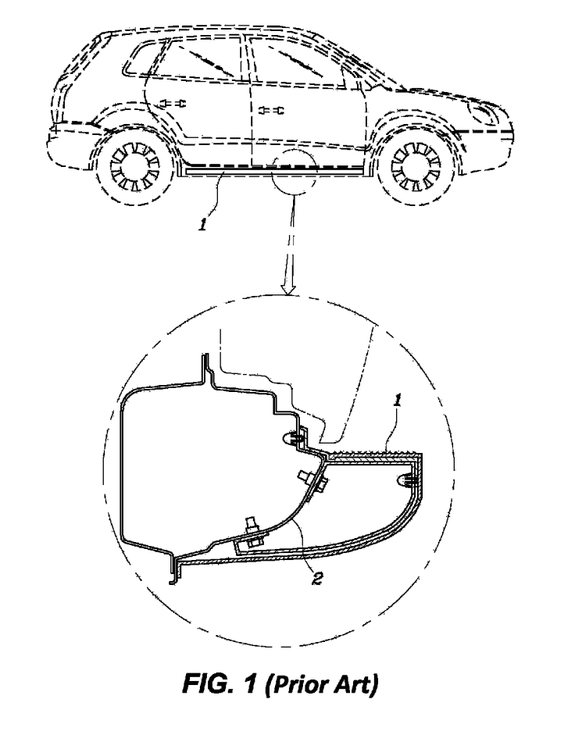
FIG. 1 is a view illustrating a side step of the related art.

Some of recreation vehicles having seats higher than those of sedans are equipped with a side step 1 for convenience of a passenger, as shown in FIG. 1.

However, a common side step 1 is simply fixed to a vehicle body 2 (side sill outer panel) and cannot be adjusted in vertical height and cannot expand in the width direction, so that a passenger is inconvenienced in using the side step 1 when getting in/out of a vehicle.

That is, a passenger can step on the side step 1 well in getting out of a vehicle and accordingly it is possible to prevent the passenger from getting hurt from a fall only when the side step 1 is conspicuous to the passenger, and the passenger can easily step and get in the vehicle only when the height of the side step 1 is small.

However, since the side step 1 of the related art has a structure that cannot adjust the vertical height and cannot expand in the width direction, a passenger is inconvenienced in using the side step 1 for getting in/out of a vehicle.

Further, a side step improved to adjust the vertical height and expand in the width direction has been developed to solve the problem, but it is inconvenient for a passenger to use the side step because the passenger should adjust the side step and expand it in the width direction in person.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for an intelligent side step apparatus for a vehicle which automatically adjusts the vertical height in a getting-in mode, automatically expands in the width direction in a getting-off mode, and is equipped with a lamp that is turned on in a night mode for safety of a passenger, thereby improving convenience of a passenger and commercial value.

Various aspects of the present invention provide for an intelligent side step apparatus for a vehicle including: fixing rails, which are fixed with both ends positioned in the left-right direction of a vehicle, in a vehicle where a door of a vehicle is positioned; a movable rail that is disposed to be movable along the fixing rails; a rotary link module that is combined with the movable rail and can adjust the height by rotation; and a step panel that is integrally combined with the rotary link module, moves to the left and right of the vehicle together with the movable rail, and adjusts the vertical height of the rotary link module The apparatus may further include a step lamp that is mounted on the step panel and turned on in a dark day or in a night mode.

The apparatus may further include: a rail actuator that provides power to slide the movable rail; a link actuator that provides power for rotation of the rotary link module; and a control unit that controls the operations of the rail actuator and the link actuator in response to a getting-on mode signal and a getting-off mode signal of a passenger.

The apparatus may further include: an illuminance sensor that detects brightness around the vehicle and a night mode, in which the control unit controls the operation of a step lamp in response to a signal from the illuminance sensor, only when a getting-on mode signal or a getting-off mode signal of a passenger is generated.

The rotary link module may include: a lower bracket that is fixed to the movable rail; a pair of rotary links rotatably coupled to the lower end of the lower bracket; and an upper bracket rotatably coupled to the upper ends of the rotary links to connect the pair of rotary links and fixes the step panel.

The rail actuator may include: a gear box and a stopper bracket which are fixed with the movable rail at both internal ends of the movable rail; a lead screw that has one end connected to the gear box to be able to transmit power and the other end rotatably coupled to the stopper bracket; a rail motor that is disposed in the gear box to be able to transmit power and provides rotational power to the lead screw through the gear box; and a lead nut that the lead screw passes through and is coupled to the fixing rail.

The link actuator may include: a link spring that is wound on a rotary shaft of the rotary link passing through the lower bracket, with one end supported by the lower bracket and the other end supported by the rotary shaft, and provides an elastic force to the rotary link to allow the rotary link standing up with respect to the lower bracket to be rotated and laid down; and a locking pin that has one that can move into and out of a locking hole formed at the rotary link, through the lower bracket, and restrict rotation of the rotary link by the link spring, when inserted in the locking hole.

The link actuator may further include a coil disposed in a pin hole, that the locking pin passes through, at the lower bracket, and when a current is applied to the coil by adjusting the control unit, the locking pin moves into/out of the locking hole.

The link actuator may include a link motor that transmits power with the rotary shaft of the rotary link passing through the lower bracket and is operated by adjusting the control unit.

A getting-off mode signal of a passenger may include a TCU signal that provides vehicle speed information about stop and traveling statuses and a junction box signal that provides information about opening/closing of a door.

A getting-on mode signal of a passenger may include a TCU signal that provides vehicle speed information about stop and traveling statuses and a smart key signal that provides information about a passenger to get in the vehicle and the distance between the passenger and the vehicle.

The methods and apparatuses of the present invention have other features and advantages which will be apparent from or are set forth in more detail in the accompanying drawings, which are incorporated herein, and the following Detailed

BRIEF DESCRIPTION OF THE DRAWINGS

FIGS. 9 and 10 are views illustrating the operation of an exemplary intelligent side step apparatus for a vehicle according to the present invention, in which

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

An intelligent side step apparatus for a vehicle according to various embodiments of the present invention is described hereafter in detail with reference to the accompanying drawings.

An intelligent side step apparatus for a vehicle according to the present invention, as shown in FIGS. 2 to 10, includes: a pair of fixing rails 11 that are fixed with both ends positioned in the left-right direction of a vehicle, in a vehicle panel (side sill outer panel) where a door of a vehicle is positioned; a movable rail 12 that is disposed to be movable along the fixing rails 11; a rotary link module 30 that is combined with the movable rail 12 and can adjust the height by rotation; a step panel 13 that is integrally combined with the rotary link module 30, moves to the left and right of the vehicle together with the movable rail 12, and adjusts the vertical height of the rotary link module 30; and a step lamp 14 that is mounted on the step panel 13 and turned on a dark day or in a night mode.

Figure 2:
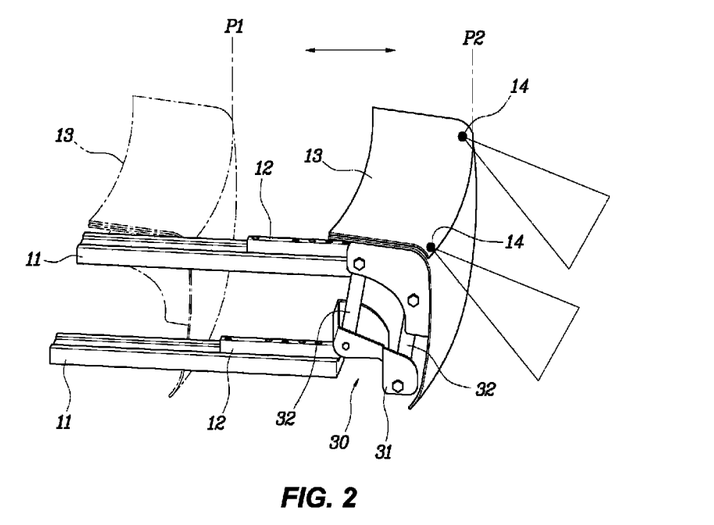
FIGS. 2 and 3 are perspective views of an exemplary intelligent side step apparatus for a vehicle according to the present invention and a block diagram illustrating the configuration, respectively.
Figure 3:
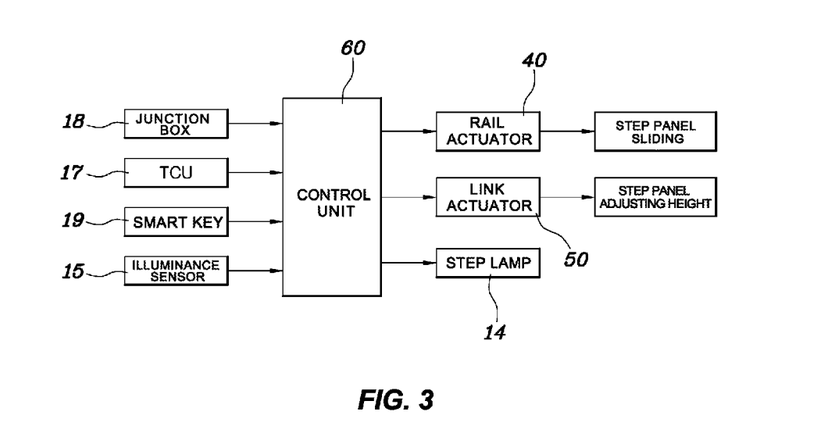

Further, the intelligent side step apparatus for a vehicle according to the present invention further includes: a rail actuator 40 that provides power to slide the movable rail 12; a link actuator 50 that provides power for rotation of the rotary link module 30; and a control unit that controls the operations of the rail actuator 40 and the link actuator 50 in response to a getting-on mode signal and a getting-off mode signal of a passenger.

Further, the present invention further includes an illuminance sensor 15 that detects brightness around the vehicle and a night mode and the control unit 60 controls the operation of a step lamp 14 in response to a signal from the illuminance sensor 15, only when a getting-on mode signal or a getting-off mode signal of a passenger is generated.

That is, the control unit 60 does not generate a control signal for operating the step lamp 14, even if a signal is transmitted from the illuminance sensor 15 to the control unit 60, when a getting-on mode signal or a getting-off mode signal of a passenger is not generated, and accordingly, the step lamp 14 cannot be turned on.

The step panel 13 connects integrally to the rotary link module 30 with the movable rail 12 so that when the movable rail 12 has moved to the left of the fixing rail 11 in FIG. 2, the step panel 13 is at the position P1, and when it has moved to the right of the movable rail 11 in FIG. 2, the step panel 13 is at the position P2.

That is, the step panel 13 can slide between the positions P1 and P2 with a slide of the movable rail 12.

Figure 9:
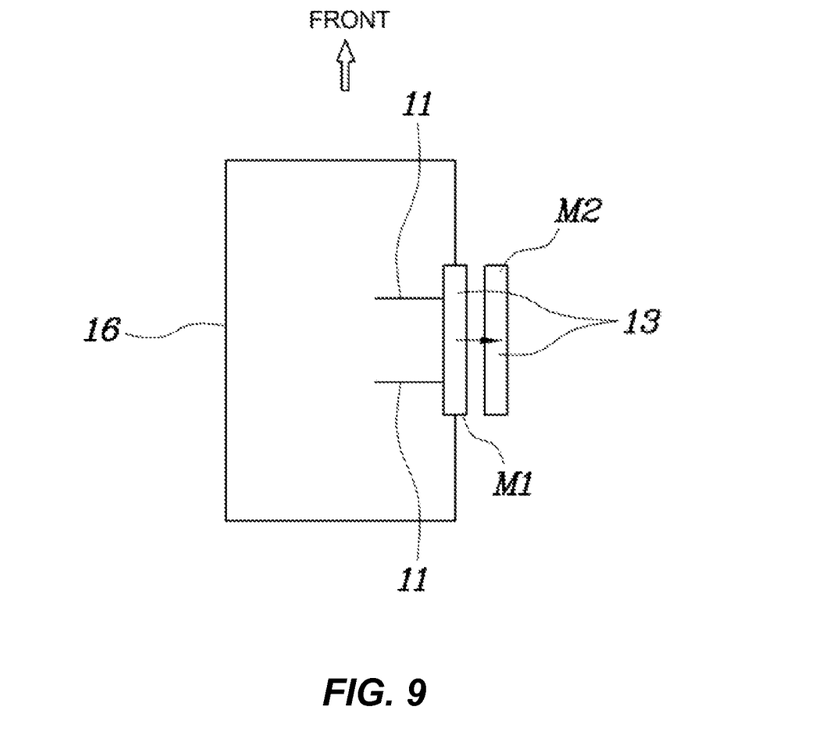
FIG. 9 is a view of a vehicle seen from the above to show expansion of the side step in the width direction and FIG. 10 is a view seen from behind a vehicle to show vertical height adjustment of the side step.

When the step panel 13 is at the position P1, referring to FIG. 9, it is the position Ml, in which the step panel 13 is in close contact with the vehicle body 16.

Further, when the step panel 13 is at the position P2, referring to FIG. 9, it is the position M2, in which the step panel 13 has protruded and expanded to a side of the vehicle body 16.

A passenger can be prevented from getting hurt from a fall and can step well on the step panel 13 only when the step panel 13 is conspicuous to the passenger, so that the step panel 13 has protruded and expanded to a side of the vehicle body 16, at the position M in FIG. 9.

Meanwhile, the movable rail 12 has to be able to move along the fixing rail 11 in order for the step panel 13 to expand in the width direction, and which can be achieved by the rail actuator 40.

Figure 4:
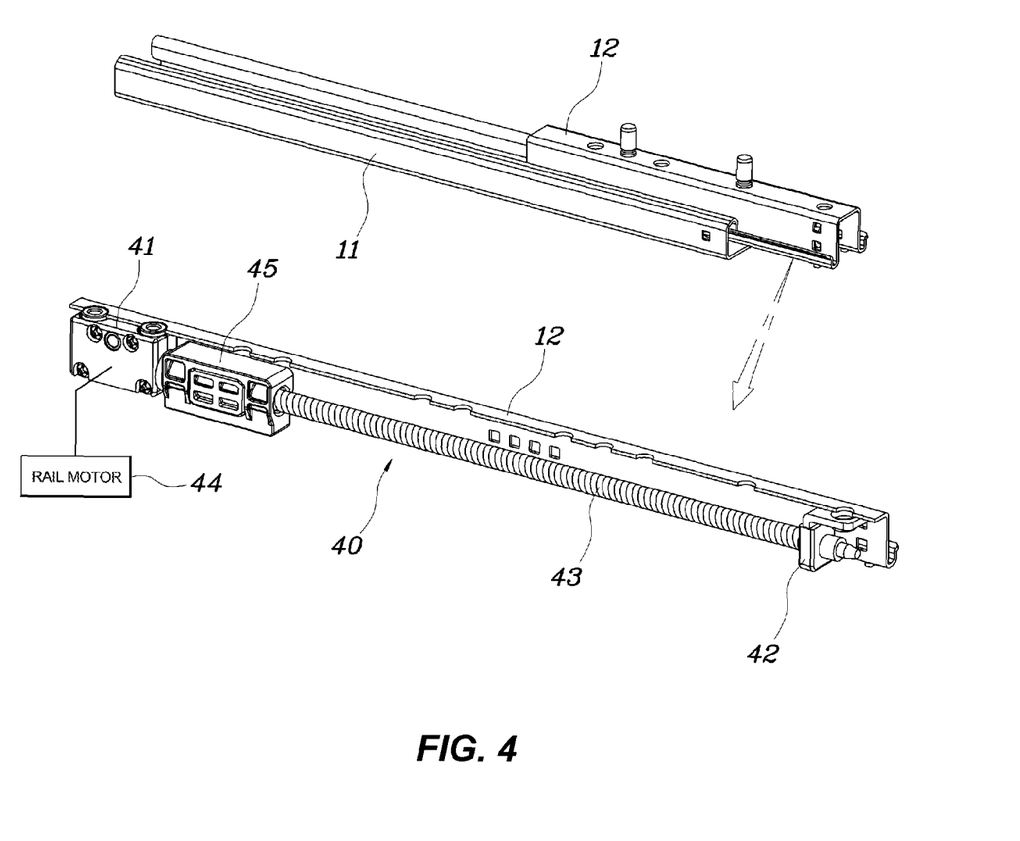
FIG. 4 is a view illustrating an exemplary rail actuator of the present invention.

The rail actuator 40 according to the present invention, as shown in FIG. 4, includes a gear box 41 and a stopper bracket 42 which are fixed with the movable rail 11 at both internal ends of the movable rail 11; a lead screw 43 that has one end connected to the gear box 41 to be able to transmit power and the other end rotatably coupled to the stopper bracket 42; a rail motor 44 that is disposed in the gear box 41 to be able to transmit power and provides rotational power to the lead screw 43 through the gear box 41; and a lead nut 45 that the lead screw 43 passes through and is coupled to the fixing rail 11.

The operation of the rail motor 44 is controlled by the control unit 60.

Therefore, as the rail motor 44 operates, the lead screw 43 is supposed to rotate and the lead nut 45 is supposed to move along the lead screw 43, but the lead nut 45 cannot move because the fixing rail 11 where it is coupled, and instead, the gear box 41, the stopper bracket 42, and the lead screw 43 slide along the fixing rail 11 together with the movable rail 12.

The configuration of the rail actuator 40 is only an example as an electric rail structure, not limited thereto, and may be implemented in various ways, if necessary.

Figure 5:
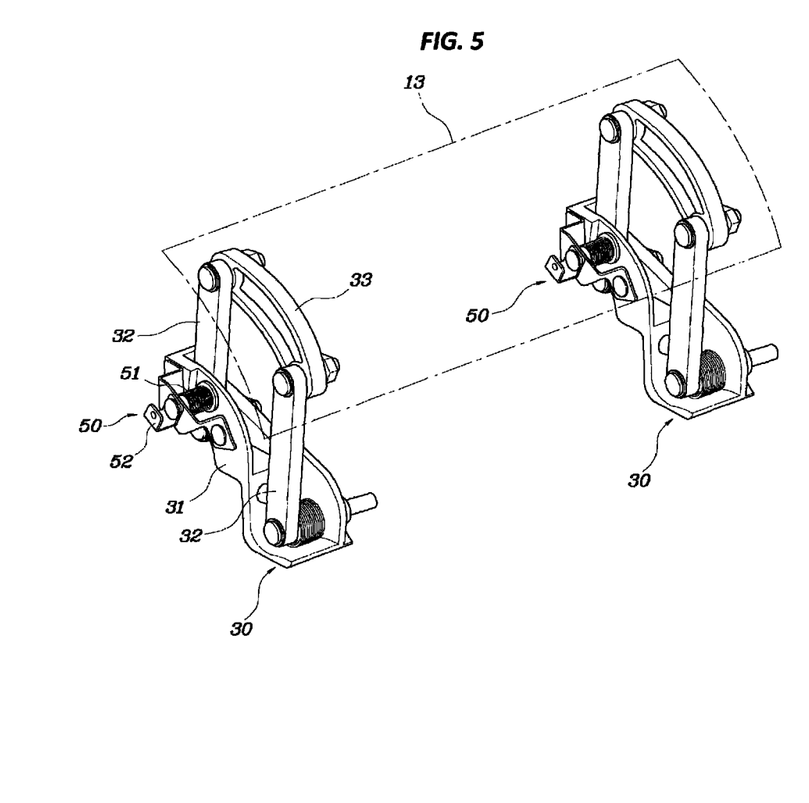
FIGS. 5 and 6 are views illustrating an exemplary rotary link module according to the present invention.
Figure 6:
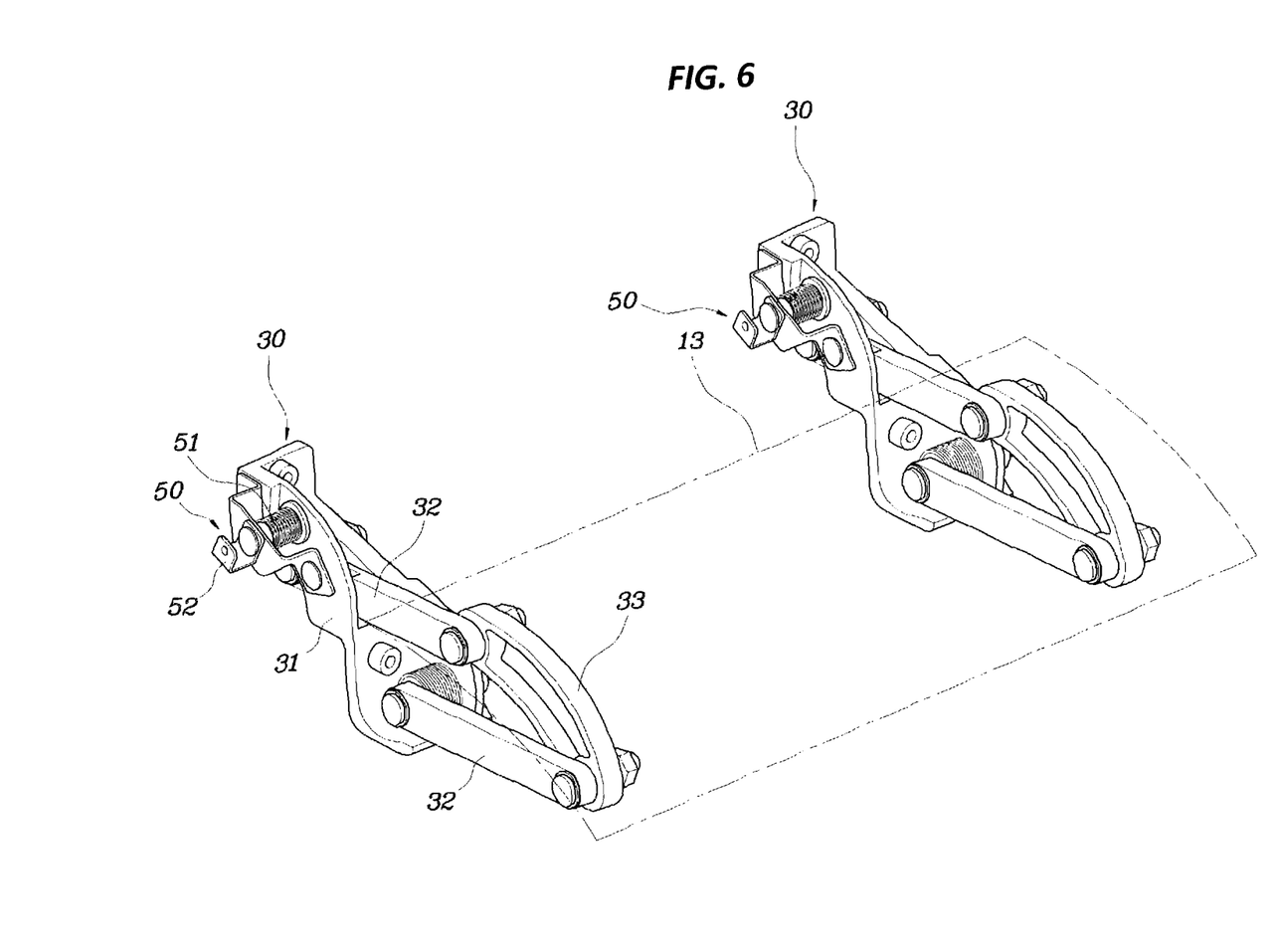

Further, the rotary link module 30, as shown in FIGS. 2, 5, and 6, includes: a lower bracket 31 that is fixed to the movable rail 12; a pair of rotary links 32 rotatably coupled to the lower end of the lower bracket 31; and an upper bracket 33 rotatably coupled to the upper ends of the rotary links 32 to connect the pair of rotary links 32 and fixes the step panel 13.

One link modules 30 is provided for each movable rail 12 in a pair and the step panel 13 connects two upper brackets 33.

Figure 10:
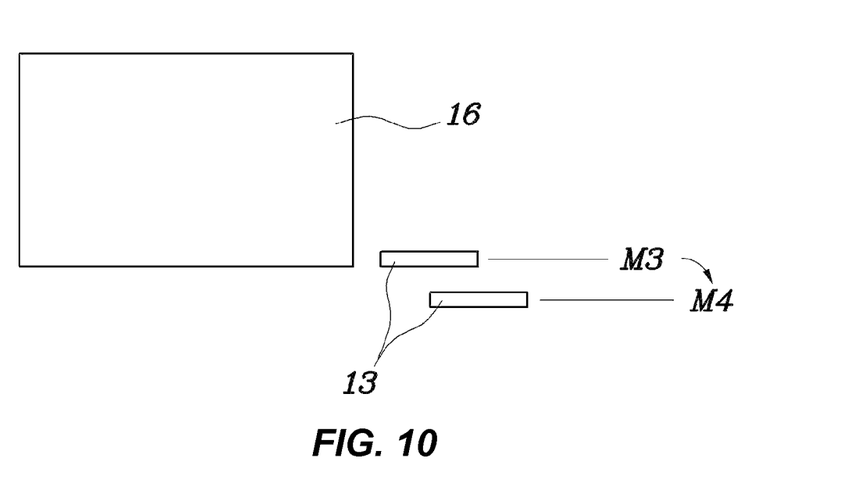

FIG. 5 shows when the rotary link 32 protrudes upward with respect to the lower bracket 31, in which the step panel 13 coupled to the upper bracket 33 has moved up, and it is at the position M3 in FIG. 10.

Further, FIG. 6 shows when the rotary link 32 has rotated with respect to the lower bracket 31 and laid down, in which the upper bracket 33 has protruded to a side further than the lower bracket 31 and the step panel 13 coupled to the upper bracket 33 has rotated and moved down, and it is at the position M4 in FIG. 10.

A passenger can conveniently step and easily get in a vehicle, only when the height of the step panel 13 is small, so that, for the configuration, the step panel 13 basically rotates down to a side and keeps the position, as indicated by the position M3 in FIG. 10.

Meanwhile, the rotary link 32 has to be able to rotate with respect to the lower bracket 31 in order for the step panel 13 to adjust the vertical height, and which can be achieved by the link actuator 50.

Figure 7:
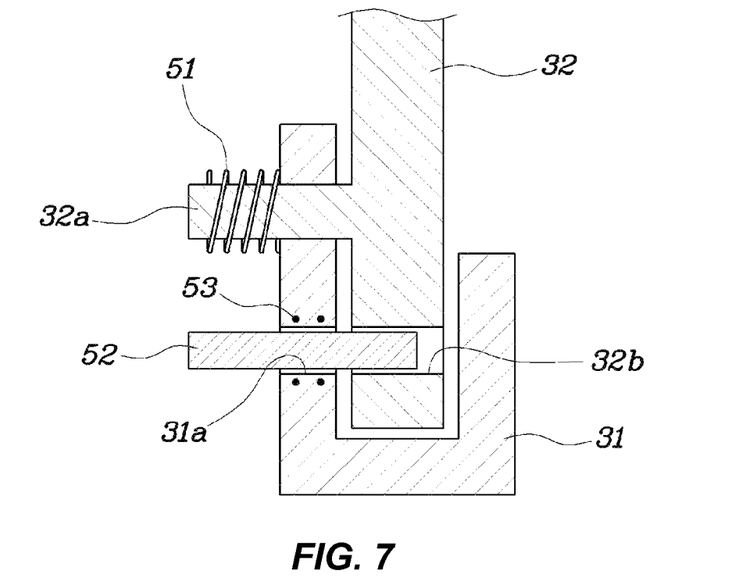
FIGS. 7 and 8 are views illustrating an exemplary link actuator of the present invention.

The link actuator 50 according to various embodiments of the present invention, as shown in FIGS. 5 and 7, includes: a link spring 51 that is wound on a rotary shaft 32a of the rotary link 32 passing through the lower bracket 31, with one end supported by the lower bracket 31 and the other end supported by the rotary shaft 32a, and provides an elastic force to the rotary link 32 to allow the rotary link 32 standing up with respect to the lower bracket 31 to be rotated and laid down; and a locking pin 52 that has one that can moves into and out of a locking hole 32b formed at the rotary link 32, through the lower bracket 31, and restricts rotation of the rotary link 32 by the link spring 51, when inserted in the locking hole 32b.

Further, the link actuator 50 according to the present invention further includes a coil 53 disposed in a pin hole 31a, that the locking pin 52 passes through, at the lower bracket 41, so that, in the configuration with the coil 53, when a current is applied to the coil 53 by adjusting the control unit 60, the locking pin 52 moves into/out of the locking hole 32b.

That is, in the status of FIG. 7, as the locking pin 52 is moved left by the control of the control unit 60 and the locking pin 53 moves out of the locking hole 32b, the rotary link 32 is rotated by the elastic force of the link spring 51.

Since the rotary link 32 keeps standing up, as shown in FIG. 5, before standing up, the step panel 13 is maintained at the up-position, and after the rotary link 32 rotates, it is in the lay-down status, as shown in FIG. 6, the step panel 13 rotates down with the rotary link 32 and keeps the position.

Therefore, the step panel 13 can adjust the vertical height with the rotation of the rotary link 32.

When the link actuator 50 includes the link spring 51 and the locking pin 52, as described above, the step panel 13 is automatically rotated to down-position (status in FIG. 6) from the up-position (status in FIG. 5) by the control unit 60, but returning from the down-position to the up-position would be manually performed.

Figure 8:
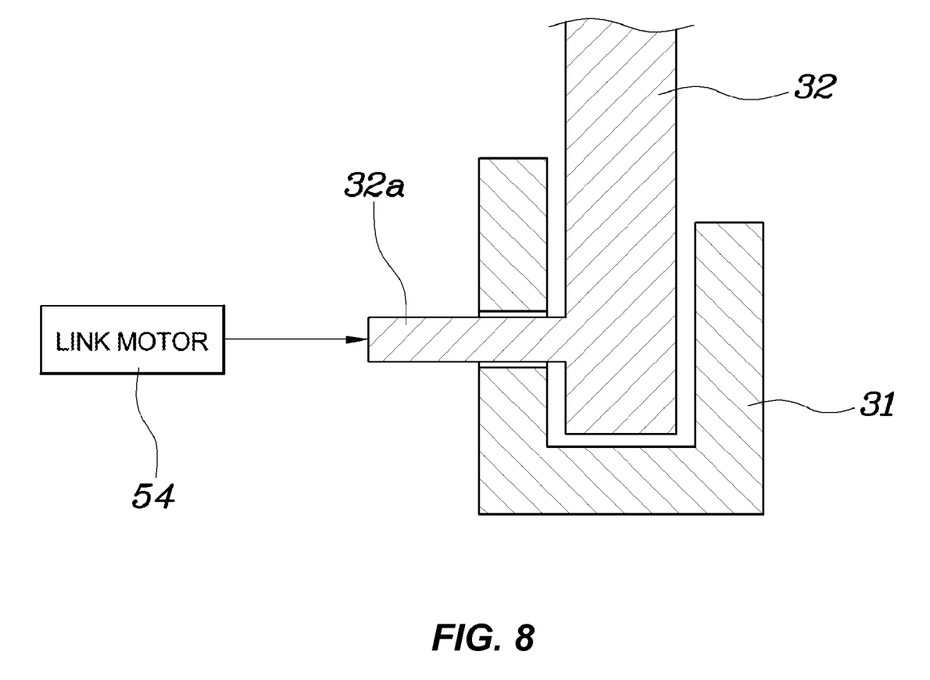

The link actuator 50 of various embodiments according to the present invention, as shown in FIG. 8, may include a link motor 54 that transmits power with the rotary shaft 32a of the rotary link 32 passing through the lower bracket 31 and is operated by adjusting the control unit 60.

As described above, when the link actuator 50 includes the link motor 54, the step panel can be automatically rotated upward and downward by the control unit 60.

On the other hand, a getting-off mode signal of a passenger that is inputted to the control unit 60 includes a signal by a transmission control unit 17 (hereafter, referred to as a TCU) that provides vehicle speed information about stop and traveling statuses and a signal from a junction box 18 that provides information about opening/closing of a door.

Further, a getting-on mode signal of a passenger that is inputted to the control unit 60 includes a signal from the TCU 17 that provides vehicle speed information about stop and traveling statuses and a signal from a smart key 19 that provides information about a passenger to get in the vehicle and the distance between the passenger and the vehicle.

The operation of various embodiments of the present invention is provided hereafter.

When a getting-off mode signal of a passenger with the vehicle speed zero and the door open is inputted to the control unit 60, the movable rail 12 is moved to a side of the vehicle along the fixing rail 11 by the operation of the rail actuator 40, in which the step panel 13 coupled to the movable rail 12 protrudes and expands to a side of the vehicle 16.

Therefore, a passenger to get out of the vehicle can get out while seeing the step panel 13 protruding to a side of the vehicle body 16 and can correctly step on the step panel 13 and get out, so that it is possible to prevent the passenger from being unexpectedly getting hurt from a fall, and accordingly, it is possible to ensure safety of the passenger and considerably improve convenience.

Meanwhile, the step panel 13 that has protruded to a side of the vehicle body 16 is brought in close contact with the vehicle body 16 and returned to the initial status by the control of the control unit 60, when a door closing signal is generated or a vehicle traveling signal is generated.

When a getting-on mode signal of a passenger with the vehicle speed zero and the door open is inputted to the control unit 60, the movable rail 12 is moved to a side of the vehicle along the fixing rail 11 by the operation of the rail actuator 40, in which the step panel 13 coupled to the movable rail 12 protrudes and expands to a side of the vehicle 16 and the step panel 13 that has moved up by the link actuator 50 is rotated down by the rotating rotary link 32 and keeps the position.

Therefore, the passenger can easily get in the vehicle while conveniently stepping on the step panel 13 that has moved down to a side of the vehicle body 16, and accordingly, it is possible to ensure safety of the passenger and considerably improve convenience.

Meanwhile, the step panel 13 that has protruded to a side of the vehicle body 16 and moved down is brought in close contact with the vehicle body 16 and returned to the initial status by the control of the control unit 60, when a door closing signal is generated or a vehicle traveling signal is generated.

Therefore, with a getting-off mode signal of a passenger or a getting-on mode signal of a passenger generated, when a night mode signal detected by the illuminance sensor 15 is inputted to the control unit 60, the control unit 60 supplies power to the step lamp 14 mounted on the step panel 13 and turns it on, so it is possible to more protect the safety of the passenger.

The turned-on step lamp 14 is automatically turned off by a signal from the control unit 60, when with a getting-off mode signal of a passenger or a getting-on mode signal of a passenger is not generated.

According to an intelligent side step apparatus for a vehicle of the present invention, a step panel protrudes and expands to a side of a vehicle body, when a getting-off mode signal of a passenger is generated, the step panel moves down to a side of the vehicle body, when a getting-on mode signal of a passenger is generated, and a step lamp mounted on the step panel is turned on, when a night mode signal is generated, so that it is possible to considerably improve convenience of a passenger and protect more safely the passenger in getting in/out of a vehicle.

For convenience in explanation and accurate definition in the appended claims, the terms upper or lower, left or right, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An intelligent side step apparatus for a vehicle, comprising:
    fixing rails, which are fixed with opposing ends positioned in a left-right direction of the vehicle, in which a door of the vehicle is positioned;
    a movable rail disposed along the fixing rails and slidable along the fixing rails in an axial direction of the fixing rails;
    a rotary link module that is combined with the movable rail and can adjust a height by rotation thereof;
    a step panel integrally combined with the rotary link module, wherein the step panel moves to the left and right of the vehicle together with the movable rail in the axial direction of the fixing rails, and adjusts a vertical height of the rotary link module;
    a rail actuator that provides power to slide the movable rail;
    a link actuator that provides power to rotate the rotary link module;
    a control unit that is configured to control operation of the rail actuator and the link actuator in response to a getting-on mode signal and a getting off mode signal of a passenger;
    a lower bracket fixed to the moveable rail;
    a pair of rotary links rotatably coupled to the lower end of the lower bracket; and
    an upper bracket rotatably coupled to the upper ends of the rotary links to connect the pair of rotary links and fixes the step panel.

2. The apparatus of claim 1, further comprising a step lamp mounted on the step panel and turned on a dark day or in a night mode.

3. The apparatus of claim 1, further comprising:
    an illuminance sensor that detects brightness around the vehicle and a night mode wherein the control unit controls the operation of a step lamp in response to a signal from the illuminance sensor, only when a getting-on mode signal or a getting-off mode signal of a passenger is generated.

4. The apparatus of claim 1, wherein the rail actuator comprises:
    a gear box and a stopper bracket which are fixed with the movable rail at opposing internal ends of the movable rail;
    a lead screw that has one end connected to the gear box to transmit power and another end rotatably coupled to the stopper bracket; and
    a rail motor disposed in the gear box to transmit power and provides rotational power to the lead screw through the gear box; and a lead nut that the lead screw passes through and is coupled to the fixing rail.

5. The apparatus of claim 1, wherein the link actuator comprises:
    a link spring wound on a rotary shaft of the rotary link passing through the lower bracket, with one end supported by the lower bracket and another end supported by the rotary shaft, and provides an elastic force to the rotary link to allow the rotary link standing up with respect to the lower bracket to be rotated and laid down; and
    a locking pin that has one end that can moves into and out of a locking hole formed at the rotary link, through the lower bracket, and restricts rotation of the rotary link by the link spring, when inserted in the locking hole.

6. The apparatus of claim 1, wherein the link actuator further includes a coil disposed in a pin hole that the locking pin passes through, at the lower bracket, and when a current is applied to the coil by adjusting the control unit, the locking pin moves into/out of the locking hole.

7. The apparatus of claim 1, wherein link actuator includes a link motor that transmits power with the rotary shaft of the rotary link passing through the lower bracket and is operated by adjusting the control unit.

8. The apparatus of claim 1, wherein a getting-off mode signal of a passenger includes a Transmission Control Unit (TCU) signal that provides vehicle speed information about stop and traveling status and a junction box signal that provides information about opening/closing of a door.

9. The apparatus of claim 1, wherein a getting-on mode signal of a passenger includes a Transmission Control Unit (TCU) signal that provides vehicle speed information about stop and traveling statuses and a smart key signal that provides information about a passenger to get in the vehicle and the distance between the passenger and the vehicle.

* * * * *